United States Patent [19]

Tsuchiya

[11] Patent Number: 4,467,561
[45] Date of Patent: Aug. 28, 1984

[54] WATER-LEVEL CONTROLLED HYDROPONIC CONTAINER

[76] Inventor: Akira Tsuchiya, 8-5, Shinmachi 2-chome, Hino-shi, Tokyo, Japan

[21] Appl. No.: 471,346

[22] Filed: Mar. 2, 1983

[30] Foreign Application Priority Data

Aug. 18, 1982 [JP]  Japan ............................... 57-142102

[51] Int. Cl.³ ............................................. A01G 31/00
[52] U.S. Cl. ...................................................... 47/60
[58] Field of Search .................... 47/60, 61, 62, 63, 64, 47/59; 137/123

[56] References Cited

U.S. PATENT DOCUMENTS 4,339,891  7/1982  Bassett ..................................... 47/71
4,343,109  8/1982  Holtkamp ............................... 47/81

*Primary Examiner*—Robert A. Hafer
*Assistant Examiner*—Bradley M. Lewis
*Attorney, Agent, or Firm*—Oblon, Fisher, Spivak, McClelland & Maier

[57] ABSTRACT

A hydroponic plant growing device comprising a container adapted to hold a particulate growing medium and nutrient solution and at least one siphon generating means with inlet opening communicating with the interior of said container and outlet opening communicating with the exterior of said container, the vertical dimension of said siphon generating means being such that the uppermost edge is positioned below the maximum fluid level of said container so as to allow passage of liquid therethrough before the liquid within said container reaches the maximum level.

3 Claims, 3 Drawing Figures

WATER-LEVEL CONTROLLED HYDROPONIC CONTAINER

BACKGROUND OF THE INVENTION

1. Field of the Invention

The present invention relates to hydroponic containers, and more specifically, hydroponic containers with improved watering mechanism.

2. Description of the Prior Art

Heretofore, hydroponic containers being in use among home gardeners have been produced in two different configurations, namely, one-pot type and two-pot type containers. Of these containers, one-pot type is a single unit container adapted to house both the growing medium and the nutrient solution. Two-pot type consists of a main container which has perforations in the bottom and is adapted to house the growing medium, and a lower container or a reservoir which keeps the nutrient solution, the former container generally being mounted on top of the latter. The two-pot type hydroponic containers often employ wicks to distribute moisture to the growing area by capillary action. These usual forms of hydroponic containers have many disadvantages. Particularly in case of one-pot type containers, no means is provided for exchange of nutrient solution in order to obviate the danger of a concentration of salts in excessive quantity due to evaporation of liquid, and to ensure that no element is lacking. Furthermore, the solution, when poured into the container, rushes down between the particulate growing medium such as, for example, gravel and most of the growing area is left still in a dry condition. A still further disadvantage of this type of containers is that it tends to accumulate waste substances of the growing plant and this causes unsightliness particularly if the container is made of a transparent material such as glass. Disadvantage of two-pot type of a container is that, though exchange of nutrient solution is possible, in order to change the solution, the plant growing container has to be detached from the solution container and has to be held while discarding the old solution and refilling with the new mix. Another disadvantage of this type of containers is that these two components are not, as a general rule, firmly attached to each other, hence, care must be taken not to drop either of the two while carrying. Still further disadvantage of this type of containers is that the lower container which keeps the nutrient solution is often made shallow compared to the main container in which the plant is actually grown and the water level of the solution is restricted within the confines of the lower container, there is a fear that the nutrients never reach the cuttings of plant, roots of which being still two short.

SUMMARY OF THE INVENTION

Accordingly, the present invention has as its principal object the provision of a novel watering mechanism which is so constructed as to allow flushing of the particulate growing medium to remove any possible accumulation of excess salts, and also, which enables exchange of the nutrient solution without lifting or removal of any constituent part thereof. Another important object of this invention is to provide a novel mechanism which automatically maintains nutrient solution at a predetermined level, discharging any excess, and also enables to change the level of the solution according to the condition of the plant being grown. These and other objects have been attained by the hydroponic container which comprises in combination a water-tight container with an open top adapted to hold a growing medium and a nutrient solution, and at least one siphon generating means projecting from and extending through the wall of said container. Said siphon generating means has an inlet opening in fluid communication with the interior of said container to receive liquid therefrom, and the outlet opening in fluid communication with the exterior of said container to discharge liquid therefrom. The vertical dimension of said siphon generating means is such that the uppermost edge is positioned a substantial distance below the periphery of said container so as to allow passage of liquid therethrough before the liquid within said container reaches the maximum level.

BRIEF DESCRIPTION OF THE DRAWINGS

The manner in which the foregoing and other objects of this invention are accomplished will be apparent from the accompanying specification and claims considered together with the drawings, wherein:

DETAILED DESCRIPTION OF THE PREFERRED EMBODIMENTS DESCRIPTION

Figure 1:
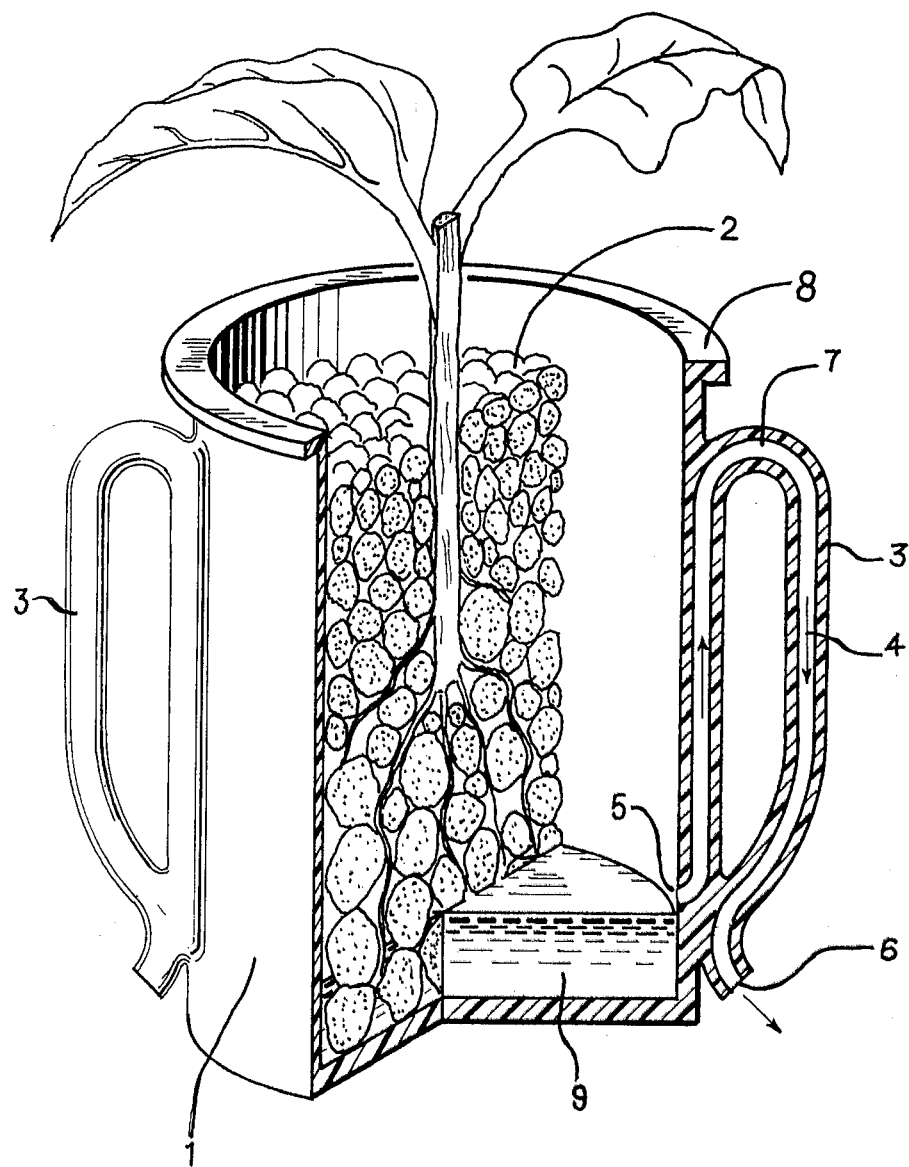
FIG. 1 is a partially cutaway perspective view of a hydroponic container embodying this invention actually in use.

Referring to the drawings, the illustrated embodiment of the invention comprises a cylindrical water-tight container 1 of more or less a conventional form made of non-porous material such as plastic adapted to house particulate growing medium 2 such as, for example, gravel. Container 1 is provided with, as integral parts thereof, D-shaped hollow handles 3 projecting outwardly from the outer surface of said container 1. Said hollow handles 3 define siphon 4 with inlet opening 5 in fluid communication with the interior of said container 1 to receive liquid therefrom, and outlet opening 6 in fluid communication with the exterior of said container 1 to discharge liquid therefrom. Said inlet opening 5 is positioned at one-fifth (1/5) height or thereabout of said container 1, and outlet opening 6 is positioned proximate the bottom of said container 1. The vertical dimension of said siphon is such that the uppermost edge 7 of said siphon 4 is positioned a substantial distance below the periphery 8 of said container so as to allow passage of liquid therethrough before the liquid within said container 1 reaches the maximum level. Said siphon 4, being thus constructed on the container, is activated whenever said container is filled with liquid near to the edge. Production of such containers may be made first molding them in halves and subsequently cementing two halves together to make a complete container.

OPERATION:

The hydroponic container embodying the present invention being constructed as described in the foregoing, can be filled with liquid up to the level of the uppermost edge 7 of siphon 4, whereat siphon 4 is activated and starts discharging the liquid therethrough in the direction indicated by arrows in FIG. 1. If no more liquid is added, the liquid level within said container descends due to drainage by siphon action until it reaches the level of inlet opening 5 whereat it stops. The remainder of liquid 9 will be retained within said container 1. The liquid, by filling up the container and flooding the growing medium, leaches out salt build up on the surface of the growing medium, simultaneously forcing out stale air from which most of its oxygen has been lost. The liquid, as it drains, draws in fresh air through the voids in the growing medium and the fresh air furnishes oxygen to the root system. The process described in the foregoing is a simulation of a natural cycle where the rainfall performs the aforesaid tasks; therefore, it provides an ideal circumstances for indoor plants. Because said siphon 4 is activated only when the liquid level exceeds the uppermost edge 7, the level of the nutrient solution can be chosen anywhere between the inlet opening 5 and the uppermost edge 7 according to the root condition of the plant being grown in the container. Handles 3 facilitates carrying and, if adequately designed, have an ornamental value.

Figure 2:
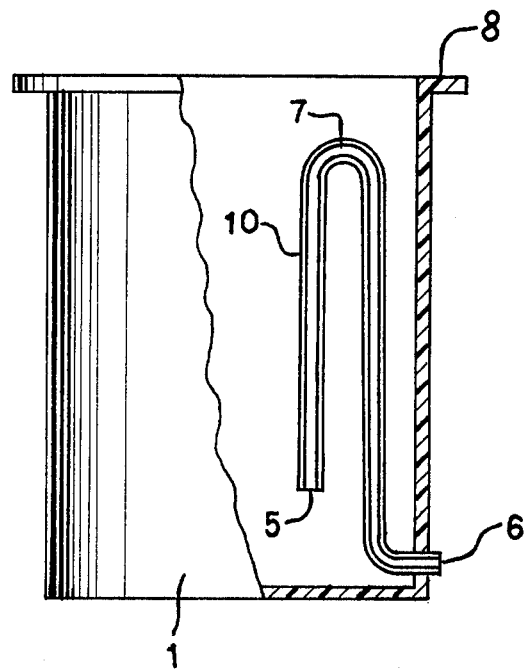
FIG. 2 is a partially cutaway view of another hydroponic container in accordance with this invention wherein siphon generating means is projecting inwardly from the inner surface of the container.
Figure 3:
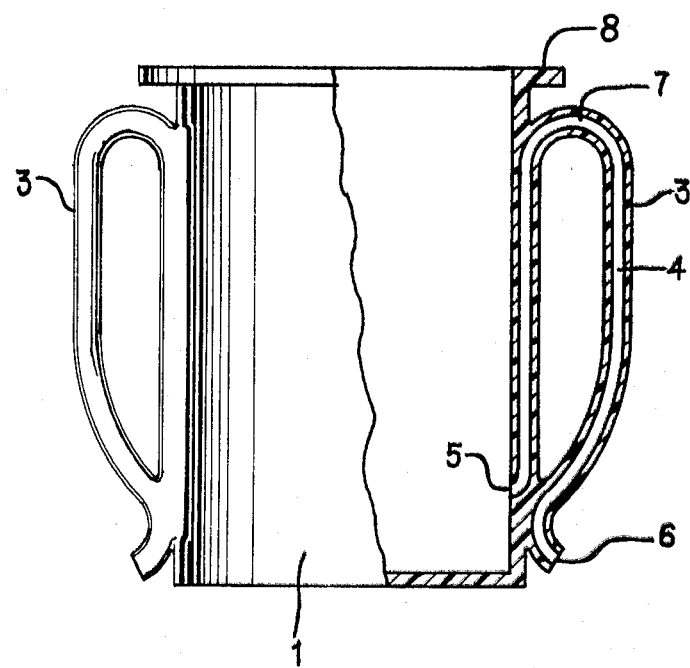
FIG. 3 is a partially cutaway view of a hydroponic container according to this invention wherein siphon generating means is projecting outwardly from the outer surface of the container same as the one indicated in FIG. 1 but the growing medium and the plant are not shown.

While the above description contains many specificities, these should not be construed as limitations on the scope of the invention but rather as an exemplification of one preferred embodiment thereof. Many other variations are possible, for example, while I have described the siphon generating portion as a hollow handle constructed on the outside wall of the container, it could be a siphon tube 10 of a simple form projecting from the inside surface of the container 1 as shown in FIG. 2 of the accompanying drawings, through this siphon tube could be an obstacle if the inside of the container 1 has to be cleaned. Accordingly, the scope of the invention should be determined not by the embodiment illustrated, but by the appended claims and their legal equivalents.

What is claimed as new and desired to be secured by Letters Patent of the United States is:

1. A hydroponic plant growing device comprising:
    a container having a bottom wall and an integral side wall extending upwardly from the peripheral edge of said bottom wall wherein said bottom wall and side wall together define an open top cavity adapted to receive and hold a particulate plant growing medium and nutrient solution; and
    at least one siphon generating means projecting from and extending through side said wall, said siphon generating means having an inlet opening in fluid communication with the interior of said container and being positioned at a predetermined distance above said bottom and below the upper level of said growing medium wall to receive liquid therefrom, said siphon generating means having an outlet opening in fluid communication with the exterior of said container and being positioned below said inlet to discharge liquid therefrom, and the vertical dimension of said siphon generating means being such that the uppermost edge thereof is positioned a substantial distance below a maximum fluid level of said container so as to allow passage of liquid therethrough before the liquid within said container reaches the maximum level and causing said container to drain to the level of said inlet opening.

2. A plant growing device of claim 1 wherein the siphon generating means comprises a hollow tube projecting inwardly from the inner surface of the container.

3. A plant growing device of claim 1 wherein the siphon generating means comprises a hollow handle projecting outwardly from the outer surface of the container.

* * * * *